Nov. 21, 1967  R. G. FERRIS  3,353,654
ANIMAL FEEDER WITH MATERIAL AGITATING AND EJECTING ELEMENTS
Filed Aug. 12, 1966  3 Sheets-Sheet 1

Inventor:
Robert G. Ferris
By Hofgren, Wegner, Allen,
Stellman & McCord
Attorneys Nov. 21, 1967 R. G. FERRIS 3,353,654
ANIMAL FEEDER WITH MATERIAL AGITATING AND EJECTING ELEMENTS
Filed Aug. 12, 1966 3 Sheets-Sheet 2
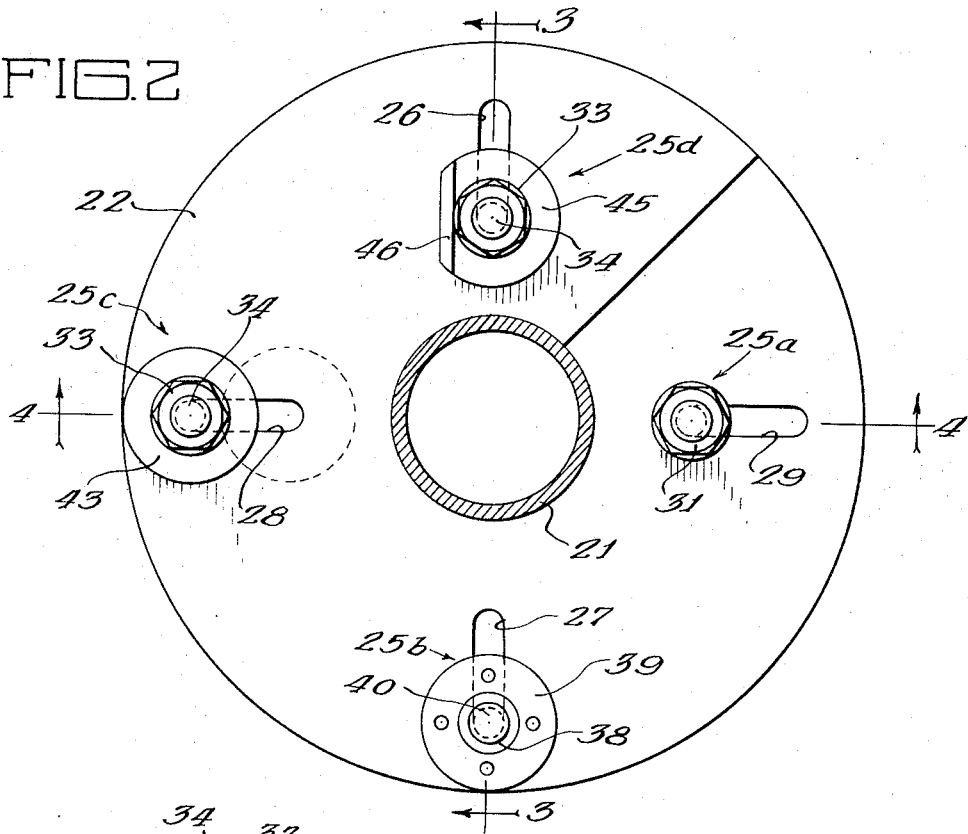
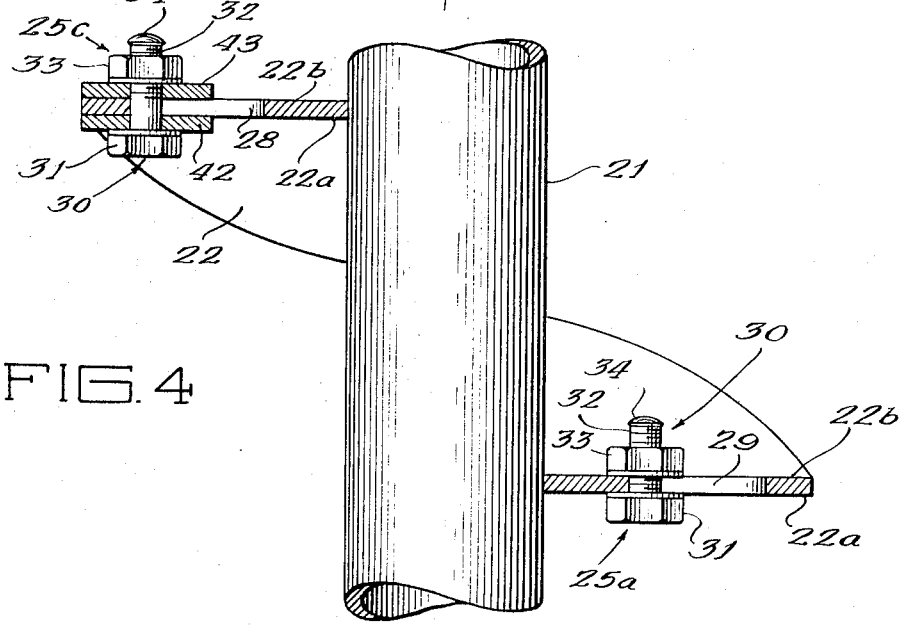

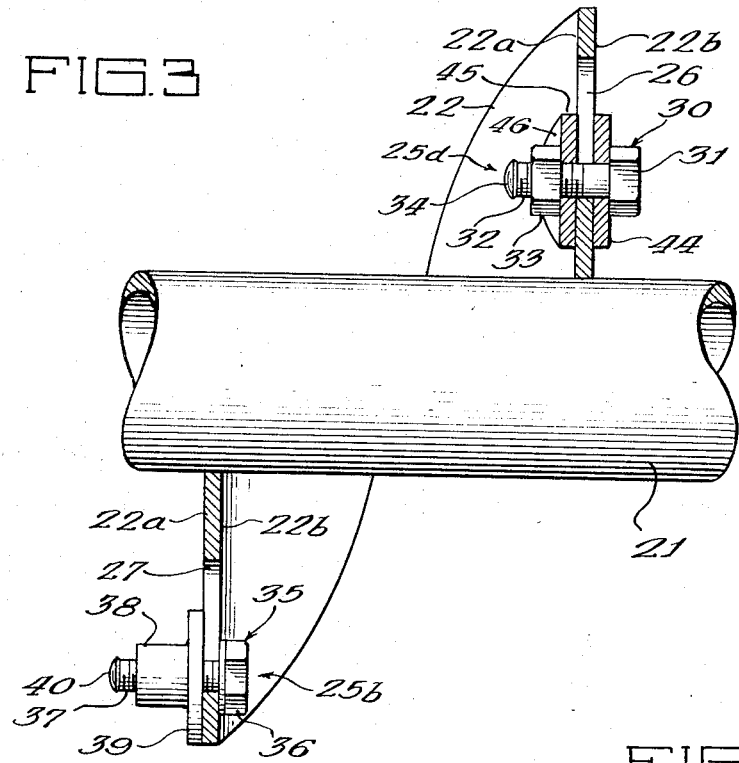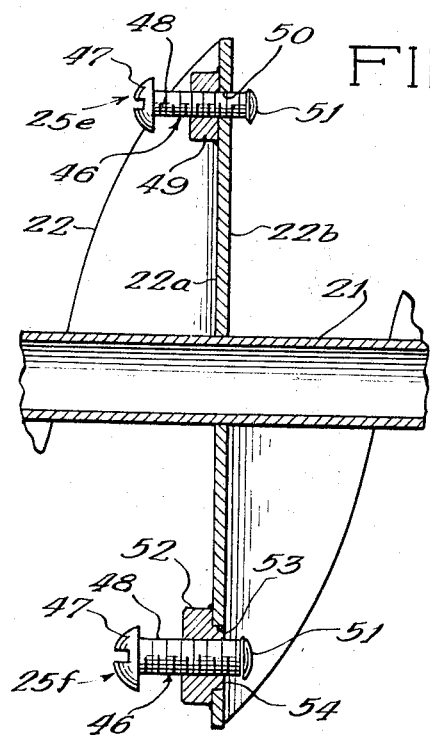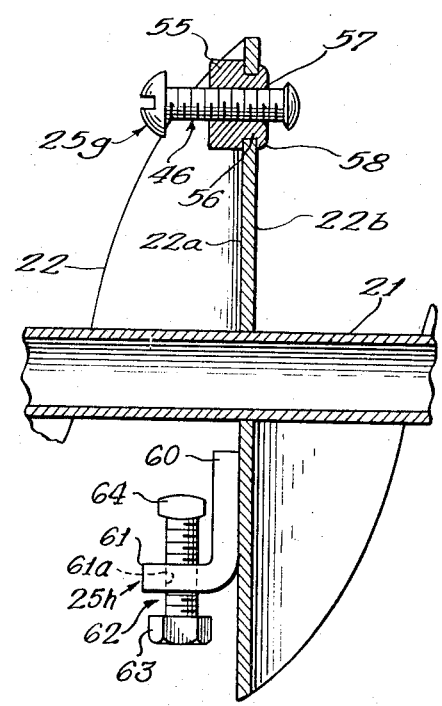

United States Patent Office 3,353,654
Patented Nov. 21, 1967

1

3,353,654
ANIMAL FEEDER WITH MATERIAL AGITATING AND EJECTING ELEMENTS
Robert G. Ferris, Harvard, Ill., assignor to Starline, Inc., a corporation of Illinois
Filed Aug. 12, 1966, Ser. No. 572,123
8 Claims. (Cl. 198—213)

This application is a continuation-in-part of my co-pending application Ser. No. 451,746, filed April 29, 1965, now abandoned, entitled "Animal Feeder With Material Agitating and Ejecting Elements."

This invention relates in general to material conveying devices, and more particularly to an improved animal feeder of the type utilizing a rotatably driven helicoid auger to discharge feed outwardly through a side opening slot in a conveyor housing.

Those skilled in the animal feeder field have recognized for many years the need for an effective animal feeder which would discharge feed into a continuous feed bunk in separate piles of desired volume, instead of into a single pile along the length of a feed bunk. One advantage of discharging the feed into separate piles is that the animals being fed will be spaced from one another, and the lack of interference from adjacent animals will enable each of the animals to eat the desired quantity of feed with a minimum amount of disturbance. Those skilled in the art have also recognized the desirability of being able to adjust the amount of feed that is discharged into each pile, so that the quantity of food intake of the animals can be controlled. A further problem which was prevalent in the past was the inability of known types of animal feeders to discharge material into separate piles of substantially equal volume from end to end of the feed bunk. Accordingly, the general purpose of the present invention is to provide an animal feeder which meets the needs and obviates the problems noted above.

An object of the invention is to provide a rotatable auger type of animal feeder with means on the flighting of the auger to augment the discharge of feed from the conveyor.

Another object of the invention is to provide an animal feeder as described above with material agitating and ejecting elements each of which has a portion extending outwardly from at least one face of the flighting into the material being conveyed to assist in discharging the material from the conveyor.

A further object of the invention is to provide material agitating and ejecting elements as described above with means adjustably and non-removably mounting the same on the auger flighting. The non-removability of the material agitating and ejecting elements is an important feature of applicant's invention, in that it obviates the possibility of the elements accidentally falling into the feed and being eaten by the animals.

These and other objects of the invention will hereinafter become more fully apparent from the following description taken in connection with the annexed drawing, wherein:

FIG. 2 is a sectional view through the auger flighting, taken substantially as shown along line 2—2 of FIG. 1;

2

Figure 1:
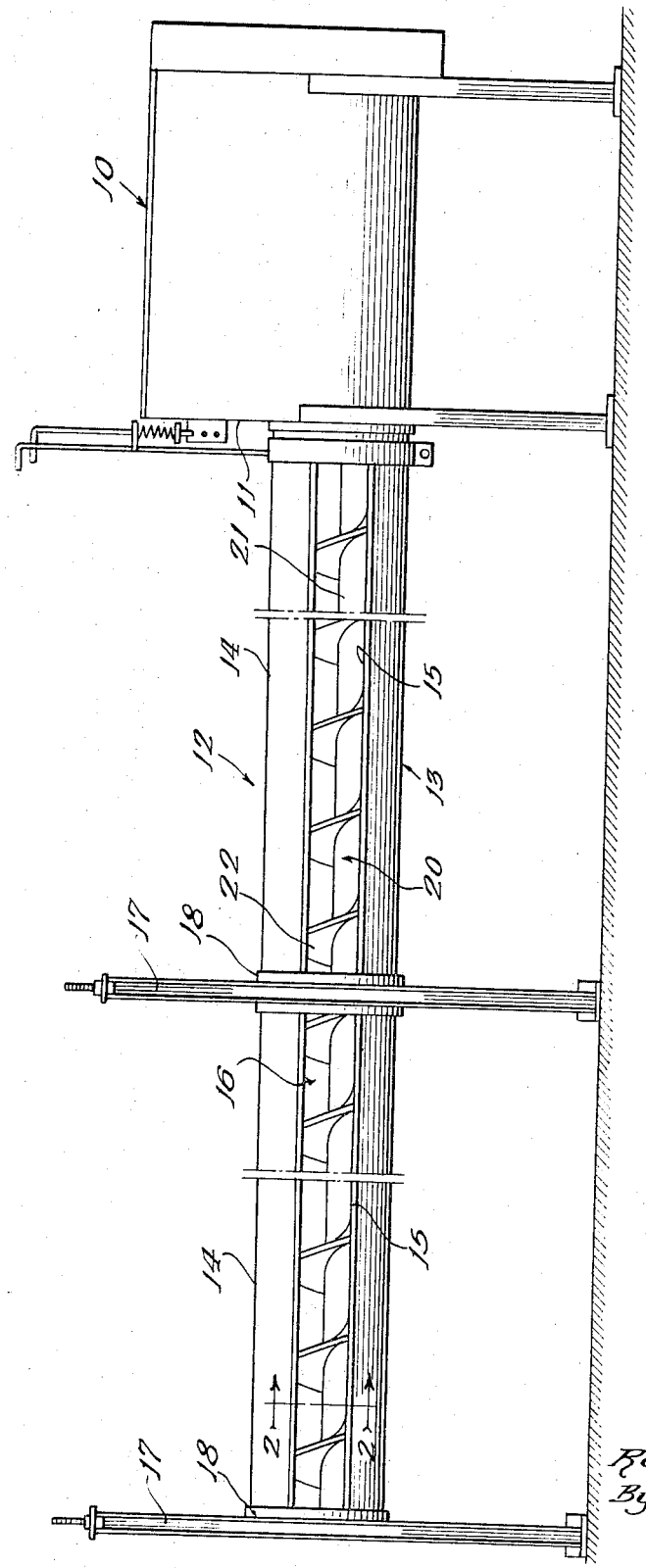
FIG. 1 is a side elevation view of a preferred embodiment of the invention.

FIG. 3 is a sectional view taken generally along line 3—3 of FIG. 2;

FIG. 4 is a sectional view taken generally along line 4—4 of FIG. 2;

FIG. 5 is a sectional view similar to FIGS. 3 and 4, and showing further modifications of the invention; and FIG. 6 is a central sectional view showing further modifications of the invention.

While this invention is susceptible of embodiment in many different forms, there is shown in the drawing and will herein be described in detail an embodiment of the invention together with modifications thereof, with the understanding that the present disclosure is to be considered as an exemplification of the principles of the invention and is not intended to limit the invention to the embodiments illustrated. The scope of the invention will be pointed out in the appended claims.

Referring now to the drawings, and particularly to FIG. 1, the illustrated embodiment of the animal feeder is seen to include a hopper 10 of generally conventional construction that is adapted to be filled with feed from a supply source, not shown. An opening, also not shown, is formed in a front wall 11 of the hopper 10; and an elongate conveyor, indicated generally at 12, extends outwardly from the hopper 10 and communicates with the interior thereof through the opening in wall 11.

Conveyor 12 includes a housing 13 that is defined by a plurality of generally identical end-to-end tubular cylindrical sections 14, with adjacent sections secured to one another by flanged connector means 18, preferably as disclosed in detail in the co-pending application of Ferris et al., Ser. No. 263,309, now Patent 3,222,228. Each section 14 includes an elongate opening 15 which extends substantially from end to end thereof, and which faces laterally outwardly from one side of the conveyor, so that the housing has a substantially continuous opening 16 from end to end thereof. As is explained in detail in the above-mentioned patent application, the conveyor 12 is supported from a plurality of spaced, generally U-shaped standards 17, and the conveyor sections 14 are adjustable relative to one another so that the disposition of the openings 15 may be varied as desired.

An auger 20 is positioned in the conveyor 12, and consists of a shaft 21 to which is secured helicoid flighting 22. As is well known in the art, drive means (not shown) are connected with the auger shaft 21 for rotating the auger 20 to advance material from the hopper 10 along the conveyor 12 and outwardly from the opening 16.

As may be seen in FIGS. 2–6, a plurality of material agitating and ejecting elements, such as the elements 25a, 25b, 25c, 25d, 25e, 25f, 25g, and 25h are provided at spaced points on the auger flighting 22. Flighting 22 includes opposite faces 22a and 22b, and each of the elements 25 extends outwardly from at least one of the faces of the flighting so as to be placed in intimate contact with the material being conveyed. It will be readily appreciated that when the auger 20 is being rotated so as to convey feed longitudinally along the conveyor 12, and laterally outwardly of the opening 16, the elements 25 will function as scoops or shovels to concentrate the feed being discharged in discrete piles in a feed bunk (not shown) positioned below the conveyor 12.

Means are associated with each of the agitating and ejecting elements 25 for adjusting the amount of interference that the elements have with the feed being conveyed, so that the quantity of material that is deposited in each of the discrete piles can be controlled. In the embodiments illustrated in FIGS. 2–4, this means includes a plurality of radial slots 26, 27, 28 and 29 in the flighting 22, which define means for adjusting the agitating and ejecting elements 25 radially of the auger.

The material ejecting element 25a in slot 29 is defined by a bolt 30 having an enlarged head 31 positioned against flighting face 22a and its threaded shank 32 extending through the slot 29 and outwardly of the flighting face 22b. A nut 33 is threaded on the shank 32 of bolt 30 to retain the same in the desired radially adjusted position on the flighting 22. The outer end of shank 32 is deformed so as to define an enlargement 34 having a dimension larger than the bore of nut 33 to retain the nut on the shank and prevent accidental loss or removal of the ejecting element.

The material ejecting element 25b in slot 27 is a cap screw 35 including an enlarged head 36 positioned against the flighting face 22b, and a threaded shank 37 extending through the slot 27 and outwardly from the flighting face 22a. A T-nut 38 is threaded on the shank 37 of the cap screw 35, and includes an enlarged flange 39 that bears against the flighting face 22a to retain the material ejecting element in the desired radially adjusted position. The outer end of the cap screw 37 is deformed as shown at 40 to provide an enlargement for preventing accidental loss or removal of the material ejecting element.

The material ejecting element 25c in slot 28 is a bolt and nut substantially the same as that shown in slot 29, but in the material ejecting element in slot 28 a washer 42 is provided under the head 31 of the bolt 30, and a washer 43 is provided under the nut 33. Washers 42 and 43 serve to increase the degree of interference of the material ejecting element with the feed, so as to define a more effective material ejecting element.

In a like manner the material ejecting element 25d in slot 26 is a bolt 30, and a washer 44 is provided under the head 31 of the bolt, with a flanged washer 45 being provided under the nut 33. Washer 45 includes a flange 46 that extends generally at right angles with respect to the flighting, to further increase the degree of interference with the feed being ejected.

The material agitating and ejecting element 25e seen at the upper portion of FIG. 5 is defined by a round head cap screw 46 having an enlarged head 47 and an externally threaded shank 48. A nut 49 is secured to the face 22a of the flighting in alignment with an opening 50 therein, as by welding. The shank 48 of screw 46 is threadably received in nut 49 and extends outwardly from the flighting face 22b, and the outer end of shank 48 is deformed to provide an enlargement 51 larger than the bore of nut 49 to prevent accidental loss or removal of the material ejecting element. It will be readily appreciated that by merely screwing the cap screw 46 into the nut 49, the distance by which the screw projects from the face of the flighting may be varied. The material ejecting element 25f is a similar round head cap screw 46, shown at the lower portion of FIG. 5, and is threadably received in a nut 52 that is secured to the face 22a of the flighting in alignment with an opening 53 therein. The nut 52 includes an axially extending pilot portion 54 of reduced diameter that is seated within the opening 53 in the flighting 22, and the large diameter portion of the nut is secured to the flighting, as by welding. In using the embodiment shown at the upper portion of FIG. 5, the nut 49 is first welded to the flighting, and the screw 46 is threadably engaged therewith, whereupon the outer end 51 of the screw is deformed. In the embodiment shown at the lower portion of FIG. 5, the screw 46 is threadably engaged with the nut 52, in position on the flighting, and the outer end 51 is deformed prior to the welding of the nut 52 to the flighting.

The material ejecting element 25g embodiment is shown at the upper portion of FIG. 6, and includes a screw 46 substantially the same as those shown in FIG. 5. The nut 55 in the embodiment at the upper portion of FIG. 6 includes an axially extending portion 56 received in an opening 57 in the flighting 22, and the outer end 58 of the portion 56 is crimped over into engagement with the flighting face 22b. Thus, in this embodiment, the necessity of welding the nut to the flighting is obviated.

The material agitating and ejecting element 25h is shown at the lower portion of FIG. 6, and includes a lug 60, welded or otherwise suitably secured to the auger flighting. Lug 60 includes a right angularly disposed portion 61 having an internally threaded bore 61a therein for reception of a hex head cap screw 62 therethrough. Screw 62 has an enlarged hexagonally shaped head 63 at one end thereof, and the other end 64 of the screw is deformed so as to be larger than bore 61a to prevent the material agitating and ejecting element from being removed from the auger flighting. Means are provided for fixing screw 62 at a selected adjusted position, and this means preferably takes the form of a distorted thread in at least one end of bore 61a. Alternatively, the internally threaded bore 61a may be out of round with respect to the shank of screw 62. Still further, a small insert of nylon, or other suitable material, may be provided between the screw shank and the bore 61a to accomplish the fixed adjustment.

I claim:

1. A material feeding device comprising: an elongate substantially horizontal auger housing having at least one side opening slot therein; an auger rotatably mounted in said housing, and including helicoid flighting with opposite faces; material agitating and ejecting elements permanently and non-detachably mounted on the auger between the axis of the auger and the peripheral edge of the auger flighting, said elements being positioned entirely inwardly of the peripheral edge of the flighting and each having a portion extending outwardly from at least one face of the flighting; and means on the auger flighting allowing adjustment of the elements relative to the flighting to a selectable position.

2. A material feeding device as defined in claim 1 wherein said elements are mounted for adjustment through a range of positions along an axis generally at right angles to the faces of said flighting, said elements being spaced from adjacent flighting convolutions in each of their adjusted positions.

3. A material feeding device as defined in claim 1 wherein said elements are mounted for adjustment generally radially of said auger.

4. A material feeding device as defined in claim 1 in which said elements are mounted for adjustment in a direction along their length, and wherein means are provided for fixedly retaining said elements at an adjusted position.

5. A material feeding device as defined in claim 4 in which said elements are mounted for adjustment in a direction parallel to said flighting face.

6. A material feeding device comprising: an elongate substantially horizontal auger housing having at least one side opening slot therein; and auger rotatably mounted in said housing, and including helicoid flighting with opposite faces; a plurality of element receiving openings in said flighting; means associated with each opening defining an internally threaded bore; and material agitating and ejecting elements each having an externally threaded shank received in one of said openings and threadably engaging the bore associated therewith to mount each element on the flighting for adjustment along an axis generally at right angles to the faces thereof, each element having a portion thereof extending outwardly from at least one face of the flighting, and each element further having enlargements thereon on opposite sides of said flighting to prevent detachment of said elements from said flighting.

7. A material feeding device as defined in claim 6 wherein said openings are slots extending generally radially from the axis of said auger.

8. A material feeding device as defined in claim 6 wherein said means defining an internally threaded bore is a nut fixed to the flighting in alignment with each opening.

References Cited

UNITED STATES PATENTS

| 1,763,121 | 6/1930 | Bailey | 259—97 |
| 2,073,059 | 3/1937 | Guthrie. | |
| 2,746,083 | 5/1956 | King | 198—213 X |

FOREIGN PATENTS 36,323   1/1906   Switzerland.

ROBERT J. HICKEY, *Assistant Examiner.*

HUGO O. SCHULZ, *Primary Examiner.*